(12) United States Patent
Turri et al.

(10) Patent No.: US 7,323,435 B1
(45) Date of Patent: *Jan. 29, 2008

(54) FLUORINATED OLIGOURETHANES

(75) Inventors: Stefano Turri, Milan (IT); Marinella Levi, Milan (IT); Tania Trombetta, Milan (IT)

(73) Assignee: Ausimont S.p.A., Milan (IT)

( * ) Notice: Subject to any disclaimer, the term of this patent is extended or adjusted under 35 U.S.C. 154(b) by 426 days.

This patent is subject to a terminal disclaimer.

(21) Appl. No.: 09/592,254

(22) Filed: Jun. 12, 2000

(30) Foreign Application Priority Data

Jun. 11, 1999 (IT) ............................. MI99A1303

(51) Int. Cl.
- *C10M 149/12* (2006.01)
- *C10M 147/04* (2006.01)
- *C08G 18/00* (2006.01)
- *C08G 73/00* (2006.01)

(52) U.S. Cl. .................... 508/446; 508/464; 528/44; 528/59; 528/65; 528/367; 521/155

(58) Field of Classification Search .......... 560/25, 560/115, 158; 528/367, 44, 59, 65; 508/446, 508/106, 552, 464; 521/155
See application file for complete search history.

(56) References Cited

U.S. PATENT DOCUMENTS

| | | | | |
|---|---|---|---|---|
| 3,968,066 A | * | 7/1976 | Mueller ............... | 260/29.2 |
| 4,746,550 A | | 5/1988 | Strepparola et al. ... | 427/385.5 |
| 4,834,764 A | * | 5/1989 | Deiner et al. ......... | 8/115.64 |
| 5,045,624 A | | 9/1991 | Falk et al. ............ | 528/70 |
| 5,663,273 A | * | 9/1997 | Haniff et al. .......... | 528/70 |
| 6,579,835 B2 | * | 6/2003 | Scicchitano et al. .... | 508/446 |

FOREIGN PATENT DOCUMENTS

| | | |
|---|---|---|
| EP | 0 430 266 A2 | 6/1991 |
| EP | 0 689 908 A1 | 1/1996 |
| EP | 0 702 041 A1 | 3/1996 |
| EP | 0 812 891 A2 | 12/1997 |
| EP | 0812891 | * 12/1997 |
| WO | WO-92/17635 | * 10/1992 |

* cited by examiner

*Primary Examiner*—Taylor Victor Oh
(74) *Attorney, Agent, or Firm*—Arent Fox LLP

(57) ABSTRACT

Fluorinated oligourethanes, having number average molecular weight lower than or equal to 9,000, having a branched structure, formed of the following monomers and macromers:

a) aliphatic, cycloaliphatic or aromatic polyisocyanates,
b) heterofunctional hydrogenated monomers having general formula:

$$X_0-(CR_1^A R_2^A)_b-Y_0 \qquad (Ib)$$

one or more of the following compounds:
c) bifunctional hydroxyl (per)fluoropolyethers (PFPE diols) having number average molecular weight in the range 400-3,000,
e) monofunctional hydroxyl (per)fluoropolyethers or monofunctional hydroxyl (per)fluoroalkanes (e'), having number average molecular weight in the range 300-1,000,
and optionally the following compounds:
d) heterofunctional monomers,
d$^f$) hydrogen-active compounds, capable to form bonds with the NCO functions stable at the hydrolysis but weak at heat.

25 Claims, No Drawings

FLUORINATED OLIGOURETHANES

The present invention relates to oligourethane compounds usable as protective hydro- oil-repellent agents on surfaces of materials such as wood, marble, stones, cement, and also of other building materials, said compounds capable to form protective films such as to confer improved hydro- oil-repellent properties of surfaces also of materials having high porosity, maintaining a protective effect which lasts longer in the time in comparison with the polyurethanes of the prior art.

More specifically the present invention relates to oligourethanes comprising (per)fluoropolyether segments, hydrophilic, ionic and non ionic organic functional groups and hydroxyl-terminations. Said oligourethanes can be used in the form of aqueous dispersions and can optionally be crosslinked.

In the prior art polyurethanes containing (per)fluoropolyether segments and salified ionic groups are known. From the patent application EP 689,908 aqueous dispersions of ionomeric (per)fluoropolyether polyurethanes are known, having a linear structure and molecular weight higher than 9,000. These polyurethanes are used as surface hydro-oil-repellent protective agents. According to this patent the application is carried out by treating the surface with an aqueous dispersion of the polyurethane. The Applicant has verified that using these polyurethanes of the prior art the polymer amount necessary to obtain a surface having hydro-oil-repellent properties depends on the material porosity. Besides, the duration of the protective effect depends on the exposure environment, wherefore it may be necessary to periodically repeat the treatment.

The need was therefore felt to have available compounds capable to form protective films such as to assure hydro-oil-repellent properties to surfaces of materials having a high porosity and capable to maintain a more lasting protective effect in the time compared with the prior art polyurethanes.

An object of the present invention is a class of fluorinated oligourethanes, having number average molecular weight lower than or equal to 9.000, determined by vapour pressure osmometry, said oligourethanes having a branched structure, optionally crosslinked, formed of the following monomers and macromers:

a) aliphatic, cycloaliphatic or aromatic polyisocyanates, having NCO functionality, determined by titration with dibutylamine-HCl (ASTM D2572), higher than 2, preferably in the range 3-4;

b) bifunctional hydrogenated monomers wherein the two functions are chemically different (heterofunctional monomers) having general formula:

$$X_0—(CR_1^A R_2^A)_b—Y_0 \quad \text{(Ib)}$$

wherein:
$R_1^A$ and $R_2^A$, equal to or different from each other, are H, aliphatic radicals from 1 to 10 carbon atoms, b is an integer in the range 1-20, preferably 1-10, $X_0=X_A H$ with $X_A=O, S$, $Y_0$ is anionic or cationic salifiable function, or, when in the formula (Ib) $X_0=OH$, b=1, $R_1^A=R_2^A=H$, $Y_0$ is an hydrophilic group preferably having formula $$—CH_2O—(CH_2—CH_2O)_{nT}—CH_3 \quad \text{(Ib1)}$$

wherein nT is an integer in the range 3-20;

and one or more of the following compounds:

c) bifunctional hydroxyl (per)fluoropolyethers (PFPE diols) having number average molecular weight in the range 400-3,000, preferably 700-2,000;

e) monofunctional hydroxyl (per)fluoropolyethers ($e^0$) or monofunctional hydroxyl (per)fluoroalkanes (e'), said compounds ($e^0$) and (e') having number average molecular weight in the range 300-1,000, preferably 400-800.

and optionally the following compounds:

d) hydrogenated monomers capable to insert a crosslinkable chemical function in the oligourethane, having the formula (Ib), wherein $R_1^A$, $R_2^A$, b and $X_0$ are as above defined and $Y_0$ is selected from the following functional groups:

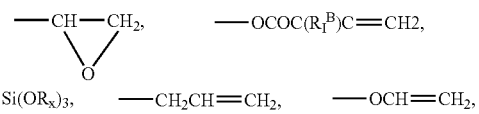

wherein
$R_I^B=H, CH_3$;
$R_x$ is a saturated $C_1$-$C_5$, preferably $C_1$-$C_3$, alkyl;

$d^I$) hydrogen-active compounds, capable to form with the NCO functions bonds which are stable at the hydrolysis but able to heat, said compounds known as blocking agents of the NCO group, selected from those of the prior art such as for example ketoximes, for example, methylethylketoxime, phenols and mono- di-alkyl substituted phenols wherein the alkyl chain contains from 1 to 8 carbon atoms, pyrazole, caprolactam, ethylmalonate, acetylacetone, ethylacetoacetate.

The preferred invention composition comprises a)+b)+c), optionally e).

Preferably the amounts of the components a)-c), monomers and macromers forming the oligourethanes according to the present invention are the following:

component a) polyisocyanate: 10-70% by weight based on the total dry oligourethane, preferably 20-40% by weight; component b) ionic heterofunctional hydrogenated monomer: the amount by weight based on the total dry oligourethane is calculated in function of the monomer molecular weight, the molar ratio of component b) with the moles of the NCO groups of the component a) ranging from 1/3:1 to 2/3:1;

component c) PFPE diol: the amount by weight is in function of the molecular weight of the macromer c), the molar ratio of the hydroxyl groups of component c) with the moles of the free residual NCO groups (the difference between the total ones and those combined with b)) is in the range 3-1.1, preferably 1.5-1.1; when component c) is absent then component e) is present;

when c) is absent, the total amount by moles of the components e)+d)+$d^I$) is in a ratio 1:1 with the moles of residual NCO (the difference between the initial total moles of a) and the moles of a) reacted with b)), and component e) must be present in an amount of at least 30% by weight based on the dry product;

when component c) is present in the formulation the total moles of the components d)+$d^I$)+e), are in a percentage in the range 0-90%, preferably 0-60% with respect to the moles of the component b).

The aliphatic, cycloaliphatic or aromatic polyisocyanates mentioned in a) are those available on the market and can for example be polyisocyanurates, biurets, adducts of the following diisocyanates: hexamethylendiisocyanate HDI, isophoron diisocyanate IPDI, toluendiisocyanate TDI, diphenylmethandiisocyanate MDI, hydrogenated diphenylmethanodiisocyanate H12-MDI. Preferred compounds are Vestanat T1890® (IPDI trimer) (Huls), Tolonate® HDT-LV (HDI trimer) (Rhone-Poulenc).

With heterofunctional monomer (component b)) according to the present invention a monomer having a functional group at each end of the chain is meant, said functional groups being different from each other.

The heterofunctional hydrogenated monomers mentioned in b) wherein preferably in the function $X_AH$ with $X_A=O$, preferably have the following structure formula:

(1A)

wherein T is $SO_3H$, COOH, or a tertiary aminic group $NR'_NR''_N$, wherein $R'_N$ and $R''_N$, equal to or different from each other, are a linear or branched $C_1$-$C_6$ alkyl, $R'_{1A}$ and $R''_{1A}$, equal to or different from each other, are hydrogen or a linear or branched $C_1$-$C_4$ alkyl; n1A is an integer in the range 1-10, preferably 1-4. Preferred are the monomers b) of formula (1A) wherein T is a tertiary aminic group, such as for example dimethyl-aminoethanol, diethyl-amino-ethanol, dimethyl-aminopropanol, diethyl-aminopropanol.

The bifunctional (per)fluoropolyethers mentioned in c) have one or more of the following units statistically distributed along the chain: $(C_3F_6O)$, (CFYO) wherein Y is F or $CF_3$, $(C_2F_4O)$, $(CR_4R_5CF_2CF_2O)$ wherein $R_4$ and $R_5$ are equal to or different from each other and selected from H, Cl, and one fluorine atom of the perfluoromethylene unit can be substituted with H, Cl or (per)fluoroalkyl, having for example from 1 to 4 carbon atoms.

The preferred compounds of component c) are the following with the perfluorooxyalkylene units statistically distributed along the chain:

 a' wherein the units $(C_3F_6O)$ and (CFYO) are perfluorooxyalkylene units statistically distributed along the chain; m' and n' are integers such as to give the above mentioned molecular weights, and m'/n' is in the range 5-40, n' being different from 0; Y is F or $CF_3$; n' can also be 0;

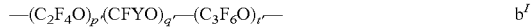 b' wherein p' and q' are integers such that p'/q' ranges from 5 to 0.3, preferably from 2.7 to 0.5 and such that the molecular weight is within the above mentioned limits; t' is an integer with the meaning of m', Y=F or $CF_3$; t' can be 0 and q'/(q'+p'+t') is equal to 1/10 or lower and the t'/p' ratio ranges from 0.2 to 6;

 c' wherein $R_4$ and $R_5$ are equal to or different from each other and selected from H, Cl; the molecular weight such as to be within the above mentioned limits, and one fluorine atom of the perfluoromethylene unit can be substituted with H, Cl or (per)fluoroalkyl, having for example from 1 to 4 carbon atoms;

the end groups of the bifunctional (per)fluoropolyethers c), said groups being equal to or different from each other, are of the $HO(CH_2CH_2O)_{x0}CH_2$— type wherein x0 is an integer from 0 to 4, preferably from 0 to 2; in the preferred compounds x0=0.

Said (per)fluoropolyethers are obtainable by known processes. See the patents U.S. Pat. Nos. 3,665,041, 2,242,218, 3,715,378 and EP 239,123.

The preferred heterofunctional monomers among those mentioned in d) have the same above mentioned formula (1A) of component b), wherein $R'_{1A}$, $R''_{1A}$ and n1A are as above defined and T is instead selected from the groups which in component d) are at the place of the function $Y_0$, the OH group of the formula 1A can optionally be substituted with a SH group.

Among the $d^I$ compounds belonging to the blocking agents class, which give with the NCO group thermally reversible bonds, 2-butanone oxime is particularly preferred.

When the component e) is formed of hydroxyl monofunctional (per)fluoropolyethers ($e^0$), they comprise one or more (per)fluorooxyalkylene units as indicated for the m component c) PFPE diol. Preferred compounds of ($e^0$) are for example the following, wherein the units are statistically distributed along the chain:

 IB wherein Y is —F, —$CF_3$; A'=—$CF_3$, —$C_2F_5$, —$C_3F_7$, —$CF_2C_1$, $C_2F_4Cl$; the units $C_3F_6O$ and CFYO are randomly distributed along the (per)fluoropolyether chain, m and n are integers, the m/n ratio is $\geq 2$. These compounds are obtainable by hexafluoropropene photooxidation according to the process described in GB 1,104,482;

 IIB wherein m is a positive integer, wherein the number average molecular weight is that above mentioned. These compounds are obtainable by ionic telomerization of hexafluoropropene epoxide: see for example U.S. Pat. No. 3,242,218;

 IIIB wherein Y is equal to —F, —$CF_3$; m, n and q, different from zero, are integers such that the number average molecular weight is that indicated for the component e). These compounds are obtainable by photooxidation of $C_3F_6$ and $C_2F_4$ mixtures by the processes described in U.S. Pat. No. 3,665,041;

the end group being of the $HO(CH_2CH_2O)_{x0}CH_2$— type wherein x0 is an integer in the range 0-4, preferably 0-2, more preferably x0=0.

When the component e) is formed of hydroxyl monofunctional (per)fluoroalkanes (e'), said compounds preferably have the formula:

 (e')

wherein $R_{fI}$ is a fluoroalkyl $C_3$-$C_{30}$, preferably $C_3$-$C_{20}$, radical; pI is 1 or 2; Q is a bivalent aliphatic $C_1$-$C_{12}$ or aromatic $C_6$-$C_{12}$ linking bridge; Q can optionally contain heteroatoms such as N, O, S, or carbonylimino, sulphonylimino or carbonyl groups; Q can be unsubstituted or it is bound to substituents selected from the following: halogen atoms, hydroxyl groups, $C_1$-$C_6$ alkyl radicals; Q preferably does not contain double or triple bonds and is saturated; preferably Q is selected from the following divalent radicals:

—$CH_2$—, —$C_2H_4$—, —$SO_2N(R^5)C_2H_4$—, —$SO_2N(R^5)CH_2CH(CH_3)$—, —$C_2H_4SO_2N(R^5)C_4H_8$—, $R^5$ is H or a $C_1$-$C_4$ alkyl.

The oligourethanes according to the present invention have number average molecular weight preferably in the range 2,000-9,000. The number average molecular weight can be measured by methods known in the art, such as for example vapour pressure osmometry VPO. Suitable solvents to effect these determinations are the fluorinated ones such as trifluoroethanol, or also non fluorinated such as for example ethyl acetate.

An other object of the present invention are compositions containing the new oligourethanes in the form of solution in polar aprotic organic solvent, such as for example esters of aliphatic carboxylic acids, aliphatic ketones or, and preferably, said compositions are in the form of aqueous dispersion. The dry content is in the range 0.1-70%, preferably 1-35% by weight.

The process of preparation of the oligourethanes of the present invention when the component c) is present, comprises the following steps:
1) dissolution of the polyisocyanate component a), for example Vestanat® T1890 or Tolonate® HDT-LV, having average functionality NCO between 3 and 4, in an anhydrous dipolar aprotic organic solvent, such as for example MEK or AcOEt (ethyl acetate), so as to have a dry content in the organic solution in the range 20-90% w/w;
2) addition of the bifunctional hydrogenated monomers indicated in b), optionally in admixture with the monomers mentioned in d) and/or the compounds indicated in d' and/or with the monohydroxyl fluorinated macromers of type (e), in a total amount by moles such that the present hydroxyl groups react with isocyanate lowering the average NCO functionality of at least ⅓ with respect to the initial one, preferably such that the average NCO functionality results at the end of this step in the range 2-2.5;
3) heating of the obtained mixture at a temperature between 50° and 80° C., in inert atmosphere, in the presence of tin organic compounds as catalysts, for example Fastcat® 4224, for the necessary time to reduce the NCO titre within the above mentioned limits (step 2), said NCO titre determined by titration with dibutylamine-HCl (ASTM D2572);
4) addition drop by drop of the reaction mixture to a solution containing the hydroxyl bifunctional (per)fluoropolyethers c) in an anhydrous dipolar aprotic organic solvent, maintained at a temperature in the range 50°-80° C., the amount of said (per)fluoropolyethers being such that the OH/NCO molar ratio is between 2 and 1.1, and the organic solvent amount such that the resulting solution has a dry concentration in the range 30-60% w/w;
5) at the end of the reaction in 4), determined by IR spectroscopy from the disappearance of the band corresponding to the NCO group, a solution of a base or of an acid is added to the mixture, depending on the type of the salifiable function present in the polymer, said base or acid dissolved in an organic preferably hydroxyl solvent, and subsequently it is diluted with water under mechanical stirring, lastly removing the organic solvents by evaporation at a reduced pressure.

The above mentioned synthesis process, as regards the main steps, can be schematized as indicated hereinafter:

Step 2)
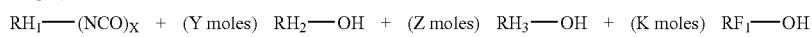

wherein X is equal to 3 ÷ 4

Step 4)  (W/2 moles) 

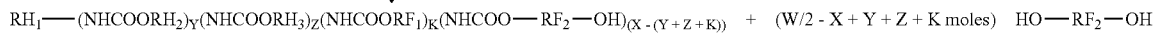

wherein:

$1 < X/(X-(Y+Z+K)) < 2.5$ $Y \neq 0; \ 0 \leq (Z+K)/(Y+Z+K) < 0.9$ $1,1 \leq W/(X-(Y+Z+K)) < 1.5 \div 3$ and being:

$RH_1$—$(NCO)_x$=polyisocyanate a)

$RH_2$—OH=salifiable heterofunctional monomer b)

$RH_3$—OH=post-crosslinkable compound d) and/or d'

$RF_1$—OH=monofunctional fluorinated macromer e)

HO—$RF_2$—OH=bifunctional (per)fluoropolyether macromer c).

Preferably the hydroxyl organic solvent used in step 5) is an aliphatic alcohol having a low molecular weight, preferably $C_1$-$C_3$. Depending on the added alcohol volume it is possible to obtain in the aqueous dispersion polymeric particles of different sizes.

The use of alcohol having low molecular weight in the formation step of the dispersion (step 5) allows to obtain polymeric particle sizes in the final dispersion ranging in inverse proportion with respect to the amount of the added alcohol. Said particle sizes can therefore be optimized in connection with the various application requirements of the invention oligourethanes.

According to the process of the invention, in the polymerization phase complete reaction of the NCO moles of component a) with the hydroxyl groups of component c) is obtained, therefore a unitary conversion degree of the reaction, determinable from the disappearance of the band corresponding to the NCO groups in the IR spectrum, without having gelling. This is surprising since by effecting statistical calculations based on the crosslinking theory (ref. G. Odjan, in "Principles of Polymerization", Wiley, New York, 1991, chapter II) it follows that with the OH/NCO ratios used gelling should take place before reaching the unitary conversion. With the process of the invention it is therefore possible to use OH/NCO ratios as above indicated, which allow to obtain a branched oligomer having a sufficiently high molecular weight. Unexpectedly the invention oligourethanes have good coating properties on different substrata, also at low temperature, higher than that of the linear polyurethanes known in the prior art. This allows to obtain surfaces with high hydro- oil-repellence properties, higher than those obtainable with the prior art polyurethanes.

Furthermore the combined use of macromers having a different functionality, even higher than 2, (for example isocyanate trimers), allows to obtain a branched structure having more functional groups, also different from each other, for example hydroxyl, acrylic, alkoxysilane, amine, allyl, blocked isocyanic (non hydrolizable) groups. The invention oligourethanes can be used as uncrosslinkable monocomponents as such, or as crosslinkable monocomponents, or as bicomponents to be crosslinked in situ in order to obtain films having hydro- and oil-repellent properties.

When in the second step (step 2) of the process for the preparation of the oligourethanes of the invention component c) is not used, the component e) is used in place thereof, and the amount by moles of said component e) is equal to that of the present NCO groups. In this way NCO groups are not left free: step 4) is not carried out and one directly passes to salification and recovery of the polymer aqueous dispersion described in step 5).

The compositions of the invention, preferably in the form of aqueous dispersions, can be applied:
- as such to give uncrosslinked polyfunctional polymeric films, capable to chemically bind with the treated surface;
- as monocomponent aqueous dispersions capable to give post-crosslinking (after application on the surface), obtaining crosslinked polymer films, for example by photochemical or peroxidic/thermal route if the oligourethanes contain unsaturations, therefore component d); or crosslinking can be thermally effected if the oligourethanes contain blocked isocyanates, i.e. component d$^I$) and at the same time component c), which reacts by means of the free hydroxyl group with the blocked isocyanates;
- as bi-component aqueous dispersions, containing a suitable crosslinking agent (for example polyisocyanates such as for example Bahydur® 3100, Bayer or Rhodocoat® WT21012, Rhodia), capable to crosslink during the application, obtaining unsoluble, transparent crosslinked polymer films having a high contact angle with $H_2O$; in this case oligourethanes must contain the component c) so as to have hydroxyl groups reactive with the crosslinking agent.

The aqueous dispersion can be applied as such on various surfaces as mentioned above or to textiles, leather, paper, to give hydro- oil-repellence and antistain properties.

The following Examples illustrate the invention without limiting it.

EXAMPLES

Hydro- Oil-Repellence Evaluation Test

The present invention polyurethanes have been applied under the form of the corresponding aqueous dispersions on asbestos cement tiles (Cembonit plates by Societa Italiana Piastre, density 1.4 Kg/dm$^3$). The application of the dispersions on the tiles was carried out by brush. The tiles were then put in a stove to dry. Hydro-repellence and oil-repellence were evaluated on the basis of the following methods:

A) Hydro-Repellence Evaluation

The resistance capability of the treated surface to wettability with water/alcohol solutions is determined, classifying the hydro-repellence by a number corresponding to a water/isopropanol mixture having a determined ratio between the two solvents, according to the test described hereinafter.

A drop is deposited on the surface and one evaluates if in 10 seconds there is drop absorption. There is absorption when after removal of the drop the presence of a surface halo is noticed. When after 10 seconds the result is negative, i.e. no absorption is noticed, one carries out the test with the solution which in the series reported hereinunder has the next number.

| Hydro-repellence value | Mixture composition WATER/ISOPROPANOL |
| --- | --- |
| 0 | water |
| 1 | 90/10 |
| 2 | 80/20 |
| 3 | 70/30 |
| 4 | 60/40 |
| 5 | 50/50 |
| 6 | 40/60 |
| 7 | 30/70 |
| 8 | 20/80 |
| 9 | 10/90 |
| 10 | isopropanol |

The hydro-repellence test is passed, when the found hydro-repellence value is 4 or 5, or higher.

B) Oil-Repellence Value

The test determines the surface resistance capability to wettability with oils, classifying the oil-repellence by a number which corresponds to an hydrocarbon having a determined surface tension. A drop is deposited on the surface and after 30 seconds it is determined if there has been absorption by noticing, after the drop removal, if an halo has formed on the substratum. When the result is negative, one passes to the hydrocarbon which in the series listed below is classified with the immediately following number.

| Qil-repellence value | Oil |
| --- | --- |
| 1 | Vaseline |
| 2 | Vaseline/n-hexadecane 65/35 |
| 3 | Hexadecane |
| 4 | n-tetradecane |
| 5 | n-dodecane |
| 6 | n-decane |
| 7 | n-octane |
| 8 | n-heptane |

The oil-repellence test is passed when the found oil-repellence value is 4 or higher.

Example 1

Obtainment of a Branched Oligourethane from IPDI

In a 250 ml 3-necked glass flask equipped with mechanical stirring, condenser, thermometer and nitrogen inlet, 45 g of Vestanat® T1890 (Huls), 51 g of anhydrous ethyl acetate, 6.189 g of dimethylaminopropanol (DMAP), 0.6 ml of a 20% Fascat® 4224 solution are introduced. It is heated under stirring at 70° C. for one hour, and then the NCO titre is controlled by sampling and titration of the end groups (ASTM D2572). Then 240 g of ethyl acetate and then 68.1 g of perfluoropolyether diol having hydroxyl equivalent weight 516 (OH/NCO ratio=1.1) and the following composition, are added:

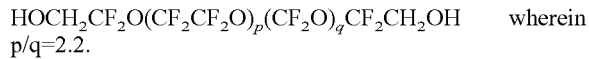 wherein p/q=2.2.

Heating at reflux is continued for further 8 hours.

At the end of this time the absence of the isocyanate bands (reaction end) is verified by IR spectroscopy. The synthetized oligourethane has an active (salifiable) nitrogen content of 0.50 eq/Kg, determinable by potentiometric titration (ASTM D2076).

A portion of polymer solution (10 ml) is washed twice with an equal perfluoroheptane volume (Galden® D80) (liquid-liquid extraction between immiscible phases) in order to extract the possible unreacted bifunctional fluorinated macromer. The ethyl acetate organic phase is then evaporated obtaining the dry polymer. A $^{19}$F-NMR analysis (Spectrometer Varian 300 MHz) is carried out which shows the presence of a couple of signals at −81.3 and −83.3 ppm, attributable to functions of —CF$_2$CH$_2$OH type chemically bound to the oligourethane structure. Such functions represent 14% by moles of the total of the —CF$_2$CH$_2$O— groups (free+those included in the urethane bond) present in the oligomer. The number average molecular weight Mn is determined by vapour pressure osmometry at 30° C. (Hitachi-Perkin Elmer mod. 115 osmometer); the molecular weight is 7.500.

The dry oligourethane is analyzed also by differential scanning calorimetry to determine the thermal transitions (Mettler TA 3000 calorimeter, scanning rate 20° C./min, calibration with indium and n-hexane). The oligourethane results biphasic with two glass transitions (Tg):

Tg1: −79° C.; Tg2: +46° C.

Example 2

Obtainment of a Branched Oligourethane from HDI

In a 250 ml 3-necked glass flask equipped with mechanical stirring, condenser, thermometer and nitrogen inlet, 35 g of Tolonate® HDT-LV (Rhone-Poulenc), 42 g of anhydrous ethyl acetate, 6.61 g of dimethylaminopropanol (DMAP), 0.5 ml of a 20% dibutyltindilaurate (DBTDL) solution are introduced. It is heated under stirring at 70° C. for one hour, then the NCO titre is controlled by taking a sample and titrating the end groups (ASTM D2572). Then 79.4 g of perfluoropolyether diol having hydroxyl equivalent weight 516 (OH/NCO ratio=1.2) and 240 g of ethyl acetate are added, and heating is continued for further 2 hours until disappearance of the NCO group signals determined by IR spectroscopy. The oligourethane has a salifiable nitrogen content of 0.53 eq/Kg (ASTM D2076).

The product is analyzed by following the procedures of the previous Example:

Fraction of residual end groups —CF$_2$CH$_2$OH=18% by moles

Average number molecular weight Mn (vapour pressure osmometry in ethyl acetate, temperature 30° C.)=5.300.

Thermal transitions Tg (differential scanning calorimetry):

Tg1: −73° C.; Tg2: −18° C.

Example 2 bis

Dispersion and Crosslinking Test of the Oligourethanes of Examples 1 and 2

17.2 g of organic solution of Example 1 and 16.1 g of that of Example 2 are mixed in a 50 ml flask and additioned with 3.1 g of acetic acid diluted in 20 ml of methanol, to salify the aminic groups of the polymers. The solution is transferred in a becker wherein water (25 ml) is dropped under strong mechanical stirring. When the addition is over, the polymer results dispersed in water and the organic solvent is removed by evaporation under vacuum at a residual pressure of 50 mmHg. The aqueous dispersion has a dry content of 30.5% w/w. 10 g of the polyurethane aqueous dispersion are weighed and 300 mg of propyleneglycol methylether acetate (PMA) and 100 mg of crosslinking agent Rhodocoat® WT 21012 (Rhodia) are added, the dispersion is applied by a bar on an aluminum panel and crosslinked for 24 hours at room temperature and for further 4 hours at 50° C. An unsoluble (resistance to immersion tests in water, acetone and 1,1,2 trichlorotrifluoroethane), transparent, continuous polymeric film (5-10 micron thickness) is obtained and characterized by static contact angle with water >1000 (determined by sessile drop with a Keyness inc. goniometer). The obtained surface is therefore chemically resistant and hydrophobic.

Example 3

Obtainment of an Oligourethane from HDI with Fluorinated Monofunctional Groups

In a 500 ml 3-necked flask equipped with mechanical stirring, condenser, thermometer and nitrogen inlet, 30 g of Tolonate® HDT-LV (Rhone-Poulenc) and 50 g of ahydrous ethyl acetate are introduced. It is maintained under mild stirring until polyisocyanate dissolution, then 160 ml of dibutyltindilaurate (DBTDL) 20% w/v in ethyl acetate are added, it is heated at 70° C. and a mixture formed of N,N dimethylaminopropanol (2.24 g) and hydroxyl monofunctional perfluoropolyether (equivalent weight 539, 17.6 g) is dropped in about 40 minutes, which has the following structure:

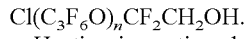

Heating is continued for another hour at 70° C. and the reaction progress is controlled by taking a sample and titrating of the end groups according to the dibutylamine/HCl (ASTM D2572) method. NCO found=9.3% on the dry product. The solution containing the reaction product between the polyisocyanate and the hydroxyl monofunctional perfluoropolyether is added in a 500 ml flask, by dropping in one hour, under nitrogen atmosphere to a solution of 71.2 g of perfluoropolyether diol having a structure as reported in the previous Examples and hydroxyl equivalent weight 538 (OH/NCO ratio=1.2), DBTDL (320 microliters at 20%) in ethyl acetate (72 g). Heating is continued under reflux for 2 hours. After this time the disappearance of the NCO group signals is verified by IR spectroscopy. The final product appears under the form of a transparent solution with a dry content of 50.9% w/w (theoretic 49.8%) and a salifiable nitrogen concentration of 0.179 eq/Kg (ASTM D2076).

Example 3 bis

Obtainment of an Oligourethane from HDI with Methacrylic Functions by Photochemical Post-Crosslinking In a 500 ml flask maintained under inert atmosphere, 100 g of Tolonate® HDT-LV and 121 g of anhydrous ethyl acetate are introduced. The mixture is left under stirring until complete polyisocyanate dissolution, then the catalyst is added (DBTDL, 500 microliters of a 20% solution in ethyl acetate). It is heated at 70° C., and in one hour a mixture formed of dimethylaminopropanol (7.56 g) and hydroxyethylacrylate (14.3 g) is added. Heating is continued for further 2 hours and lastly, following the procedures described in the previous Examples, the reaction mixture is added to a solution formed of 236 g of perfluoropolyether diol having equivalent weight 538 in 250 g of ethyl acetate and containing 1 ml of DBTDL at 20% in ethyl acetate. It is heated under stirring for further 3 hours until the NCO band, verified by IR spectroscopy, disappears.

In the IR spectrum it is possible to identify the presence of bands at about 1,640 cm$^{-1}$ attributable to functions of methacrylic type. The salifiable nitrogen content of the compound is 0.20 eq/Kg.

Example 3 ter

Obtainment of an Oligourethane from HDI Having Blocked Isocyanic Groups by Thermal Post-Crosslinking In a 500 ml flask maintained under inert atmosphere 100 g of Tolonate® HDT-LV and 121 g of anhydrous ethyl acetate are introduced. The mixture is left under stirring until complete dissolution of the polyisocyanate, then the catalyst is added (DBTDL, 500 microliters of a 20% solution). It is heated at 70° C., and in 1 hour a mixture formed of dimethylaminopropanol (7.56 g) and butanoneoxime (10.7 g) is added. Heating is continued for further 2 hours, then, following the procedures described in the previous Examples, the reaction mixture is added to a solution formed of 250 g of perfluoropolyether diol having equivalent weight 538, dissolved in ethyl acetate (250 g) and containing 1 ml of DBTDL at 20%. It is heated under stirring for further 3 hours until in the IR spectrum the NCO band disappears. The oligourethane has a salifiable nitrogen content of 0.199 eq/Kg.

100 g of solution corresponding to 48 g of dry oligourethane are transferred in a 250 ml flask and the polymer is salified by addition of 0.62 g of acetic acid dissolved in methanol (20 g), leaving under stirring for further 60 minutes. The solution containing the salified polymer is transferred in a 400 ml becker wherein 150 g of water are dropped in 15 minutes under mechanical stirring (helix rotor at 1800 rpm). When the addition is over, the polymer results dispersed in water and the dispersion is transferred in a glass flask. The organic solvent is removed by evaporation under vacuum. The dispersion is additioned with catalyst (Fascat 4224, 0.1% by weight on the dry oligourethane) and applied by a bar on an aluminum panel. After 15 minutes at room temperature, the panel is crosslinked at 150° C. for 30 minutes in ventilated stove. An unsoluble (resistance to immersion tests in water, acetone and 1,1,2 trichlorotrifluoroethane), continuous polymeric film (5-10 micron thickness), is obtained and characterized by static contact angle with water >100° (determined by sessile drop with a Keyness inc. goniometer). The obtained surface is therefore chemically resistant and hydrophobic.

Example 4

Obtainment of an Oligourethane from IPDI and Fluorinated Monofunctional PFPEs

In a 500 ml 3-necked flask equipped with mechanical stirring, condenser, thermometer and nitrogen inlet, 38 g of Vestanat® T1890 (Huls) and 56.8 g of ahydrous ethyl acetate are introduced. It is maintained under mild stirring until polyisocyanate dissolution, and then 152 ml of a 20% dibutyltindilaurate (DBTDL) solution in ethyl acetate are added. It is heated up to 70° C. and a mixture formed of N,N dimethylaminopropanol (2.1 g) and hydroxyl monofunctional perfluoropolyether (equivalent weight 539, 16.7 g) is dropped in about 60 minutes. Heating is continued for 2 hours at 70° C., controlling the reaction progress by taking a sample and titrating the end groups according to the dibutylamine/HCl method (ASTM D2572, NCO found=7.0% on the dry product). When the reaction is over, the polyisocyanate solution containing the monofunctional perfluoropolyether derivative is added in one hour, under nitrogen atmosphere, in a 500 ml flask containing a solution of 66.8 g of perfluoropolyether diol having hydroxyl equivalent weight 538, (OH/NCO ratio=1.2), DBTDL (300 microliters at 20%) in ethyl acetate (67 g). Heating is continued under reflux for 2 hours. After this time by IR spectroscopy the disappearance of the NCO group signals is verified. The final product appears under the form of a transparent solution with a dry content of 49.6% (theoretic 49.9%). The oligourethane has a salifiable nitrogen content of 0.143 eq/Kg (ASTM D2076).

Example 5

Preparation of an Aqueous Dispersion of the Ionomeric Perfluoropolyether Polyurethane of Example 3 with Polymeric Particles having a 42 nm Diameter 72.6 g of the organic solution of the Example 3 polymer (37 g of dry product) are weighed in a 250 ml flask. Under magnetic stirring, a mixture of acetic acid (0.4782 g) and isopropanol (IPA) (17.8 g) is added and left under stirring for further 60 minutes. The solution containing the salified polymer is transferred in a 400 ml becker wherein 130 g of water are dropped in 15 minutes under mechanical stirring (helix rotor at 1,800 rpm). When the addition is over, the polymer results dispersed in water and the obtained dispersion is transferred in a glass flask. The organic solvent is removed by evaporation under vacuum. An aqueous polymeric dispersion is obtained, which has the following characteristics:

content in dry residue: 24.6% w/w residual organic solvent: lower than 1% particle diameter (dynamic light scattering, Brookhaven B1200SM goniometer equipped with a laser Spectra Physics at 514.5 nm): 42 nm—polydispersity 0.2.

The dispersion, added with PMA in an amount of 10% w/w on the dry product, is spread on a glass specimen and dried for 24 hours at room temperature. The static contact angle is measured with bidistilled water and n-hexadecane by a Keyness goniometer obtaining the following results:

Contact angle with water: 114°

Contact angle with n-hexadecane: 79°

The treated surface is therefore at the same time hydrophobic and oleophobic (hydro- oil-repellent).

Example 6

Preparation of an Aqueous Dispersion of the Ionomeric Perfluoropolyether Polyurethane of Example 3 with Polymeric Particles having a 300 nm Diameter According to the same procedures described in Example 5, 61.8 g of the organic solution of the polymer of Example 3 are dispersed in water with 0.4069 g of acetic acid diluted in 3.14 g of IPA (isopropanol). By operating as described in Example 5, a polymeric dispersion having the following characteristics is obtained:

dry content: 30.3% residual organic solvent: lower than 1% particle diameter, determined as described in Example 5: 300 nm—polydispersity 0.08.

Example 7

Preparation of an Aqueous Dispersion of the Ionomeric Perfluoropolyether Polyurethane of Example 3 with Polymeric Particles having a 30 nm Diameter With the same procedures of Example 5, 72.4 g of a polymer solution of Example 4 and 0.4236 g of acetic acid diluted in 18.6 g of IPA, are dispersed.

A polymeric dispersion having the following characteristics is obtained:

dry content: 21.5% w/w residual organic solvent: lower than 1% particle diameter, determined as described in Example 5: 30 nm—polydispersity 0.28.

The surface properties are the following:

Contact angle with water: 103°

Contact angle with n-hexadecane: 63°

The treated surface is therefore at the same time hydrophobic and oleophobic (hydro- oil-repellent).

Example 8

Preparation of an Aqueous Dispersion of the Ionomeric Perfluoropolyether Polyurethane of Example 4 with Polymeric Particles having a 470 nm Diameter With the procedures of the previous Example, 57.4 g of the polymer of Example 4 are dispersed with 2.8 g of IPA and 0.3362 g of AcOH. A dispersion having the following characteristics is obtained:

dry content: 27.1% w/w solvent: lower than 1% particle diameter, determined as described in Example 5: 470 nm—polydispersity 0.2.

Therefore the use of isopropanol in the dispersion formation step allows to preregulate, as shown in Examples 5-8, the particle size of the final dispersion, which can be optimized in connection with the application requirements.

Example 9

Comparative

Synthesis and Dispersion of a Linear Ionomeric Oligourethane Having a Low Content of Salifiable Nitrogen In a 4-necked flask equipped with mechanical stirring, condenser, thermometer, dropping funnel and maintained under nitrogen, 133.9 g of IPDI, 229 g of anhydrous ethyl acetate and 1.9 ml of DBTDL at 20% in ethyl acetate, are introduced. It is heated at 70° C. and 400 g of perfluoropolyether diol, wherein the perfluoropolyether part has the same chemical structure as the perfluoropolyethers used in the previous Examples and equivalent weight 664, are dropped in 30 minutes. It is let react for one hour and then a mixture formed of 12.56 g of N-methyldiethanolamine and 17.62 g of 1.4 butanediol dissolved in 335 g of anhydrous ethyl acetate is dropped in one hour. It is let react for further 4 hours, until the NCO group bands disappear from the IR spectrum. A linear ionomeric polyurethane is thus obtained with a salifiable nitrogen content of 0.186 eq/Kg.

A portion of 45 g of the obtained polyurethane solution is added with 0.30 g of acetic acid diluted in isopropanol (11 g). To the salified polymer 60 g of water are slowly added, maintaining the mixture under vigorous mechanical stirring (2,000 rpm). When the addition of water is over, the organic solvent is evaporated under vacuum (50 mmHg) at 30° C., obtaining a polymer dispersion at 27% of dry product (residual organic solvent <1%), and characterized by average particle sizes of 200 nm, determined according to light scattering as in the previous Examples.

The polyurethane dispersion is additioned with PMA in an amount of 10% w/w on the dry product, and applied by a bar on a glass specimen likewise the previous Examples. During the drying phase, the polyurethane film tends to shrink and not to wet the surface, not forming an uniform surface.

Example 9 bis

Mixture of the Dispersions Obtained in Examples 5, 6 and 8

3 parts by weight (on the dry product) of the dispersion obtained in Example 5 are mixed with 5 parts by weight (on the dry product) of the dispersion of Example 6 and 2 parts by weight (on the dry product) of that of Example 8.

Example 10

Some glass cement tiles are treated with polyurethanes diluted dispersions (5% in $H_2O$) obtained respectively in Examples 5, 6, 8, 9 and 9 bis, applying by brush an amount of polymer of the order of 8-10 $g/m^2$ (amount on the dry product). The tiles are dried in stove at 50° C. for 4 hours. The hydro-repellence and oil-repellence are evaluated as described in Example 8. The results are reported in Table 1.

The Table shows that the oligourethanes of the present invention have an high surface activity.

Example 11

Comparison of the Hydro-Oil-Repellent Properties of a Film Obtained with the Branched Oligourethanes of the Invention with Those of a Film Obtained with the Linear Polyurethane of the Comparative Example 9 After Immersion Test in Water Some asbestos cement tiles have been treated respectively (10 g/m²) with the aqueous dispersion of branched oligourethane of Example 9 bis and with that of linear cation polyurethane of Example 9. The tiles were dried in stove at 50° C. for 12 hours, then dipped in distilled water (500 ml) at 23° C. for 30 minutes. After said period, the tiles were dried again in stove at 50° C. for 12 hours. Hydro- oil-repellence has been evaluated according to the above mentioned procedures. The results are reported in Table 2. In the Table it is shown that the film obtained with the oligourethane of the present invention (Example 9 bis) maintains the hydro- oil-repellent properties, differently from that obtained with the linear polyurethane (Example 9).

TABLE 1

Hydro- (Wr) and oil- (Or) repellence evaluation of tiles treated with the polymers or mixtures of the polymers of the indicated Examples. The applied amounts are calculated on the dry product.

| Polymer Ex. | Applied amount g/m² | Wr | Or |
|---|---|---|---|
| — | 0 | 0 | 0 |
| Ex. 5 | 8–10 | 4 | 5 |
| Ex. 6 | 8–10 | 4 | 4 |
| Ex. 2bis | 8–10 | 4 | 5 |
| Ex. 9 (comp.) | 8–10 | 1 | 2 |
| Ex. 9bis | 8–10 | 6 | 5 |

TABLE 2

Hydro- (Wr) and oil- (Or) repellence evaluation of tiles treated with the polymers or mixtures of the polymers of the indicated Examples, afer dipping in water. The applied amounts are calculated on the dry product.

| Polymer Ex. | Applied amount g/m² | Wr | Or |
|---|---|---|---|
| Ex. 9 (comp.) | 10 | instantaneous absorption H₂O | instantaneous absorption vaseline |
| Ex. 9bis | 10 | 4 | 4 |

The invention claimed is:

1. A method to form films having hydro and oil repellant properties on surfaces of objects, said method comprising applying to said surfaces aqueous dispersions of fluorinated oligourethanes having a number average molecular weight lower than or equal to 9,000, determined by vapor pressure osmometry, said oligourethanes having a branched structure, optionally crosslinked, formed of the following monomers and macromers:

a) aliphatic, cycloaliphatic or aromatic polyisocyanates, having NCO functionality, determined by titration with dibutylamine-HCl (ASTM D2572), higher than 2;

b) bifunctional hydrogenated monomers wherein the two functions are chemically different, having formula:

$$X_0-(CR_1^A R_2^A)_b-Y_0 \qquad (Ib)$$

wherein:
   $R_1^A$ and $R_2^A$, equal to or different from each other, are H or aliphatic radicals from 1 to 10 carbon atoms,
   b is an integer in the range 1-20,
   $X_0=X_A H$ with $X_A=O$ or S,
   $Y_0$ is $SO_3$, COOH or a tertiary aminic group $NR'_N R''_N$, wherein $R'_N$ and $R''_N$, equal to or different from each other, are a linear or branched $C_1$-$C_6$ alkyl, or, when in the formula (Ib) $X_0=OH$, b=1, $R_1^A=R_2^A=H$, $Y_0$ is a hydrophilic group having formula $$-CH_2O-(CH_2-CH_2O)_{nI}-CH_3 \qquad (Ib1)$$

wherein nI is an integer in the range 3-20;
   and one or more of the following compounds:
   c) bifunctional hydroxyl (per)fluoropolyethers having a number average molecular weight in the range 400-3,000;
   e) monofunctional hydroxyl (per)fluoropolyethers (e⁰) or monofunctional hydroxyl (per)fluoroalkanes (e'), said compounds (e⁰) and (e') having a number average molecular weight in the range 300-1,000,
   and optionally the following compounds:
   d) hydrogenated monomers capable to insert a crosslinkable chemical function in the oligourethane, having the formula (Ib), wherein $R_1^A$, $R_2^A$, b and $X_0$ are as above defined and $Y_0$ is selected from the following functional groups:

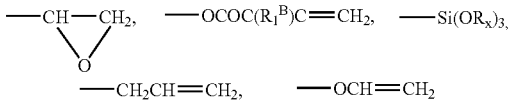

wherein
   $R_f^B=H, CH_3$;
   $R_x$ is a saturated $C_1$-$C_5$;
   d') blocking agents of the NCO group, wherein the blocking agent is one or more compounds selected from the group consisting of ketoximes, phenols, mono- di-alkyl substituted phenols with an alkylic chain from 1 to 8 carbon atoms, pyrazol, caprolactam, ethylmalonate, acetylacetone and ethylacetoacetate.

2. The method according to claim 1, wherein films are obtained by crosslinking with polyisocyanates oligourethanes consisting essentially of components a), b), and c).

3. The method according to claim 1, wherein films are obtained by thermally or photochemically crosslinking oligourethanes, said oligourethanes consisting essentially of components a), b), c), and d).

4. The method according to claim 1, wherein films are obtained by thermally crosslinking oligourethanes, said oligourethanes consisting essentially of components a), b), c), and d').

5. The method according to claim 1, wherein the a) aliphatic, cycloaliphatic or aromatic polyisocyanates have NCO functionality, determined by titration with dibutylamine-HCl (ASTM D2572), in the range 34.

6. The method according to claim 1, wherein for b), b is an integer in the range 1-10.

7. The method according to claim 1, wherein the number average molecular weight of c) bifunctional hydroxyl (per)fluoropolyethers (PFPE diols) is in the range 700-2,000.

8. The method according to claim 1, wherein the number average molecular weight of e) monofunctional hydroxyl (per)fluoropolyethers ($e^O$) or monofunctional hydroxyl (per)fluoroalkanes (e') is in the range 400-800.

9. The method according to claim 1, wherein films are obtained by crosslinking with polyisocyanates oligourethanes consisting essentially of components a), b), c), and e).

10. The method according to claim 1, wherein films are obtained by crosslinking with thermally or photochemically oligourethanes, said oligourethanes consisting essentially of components a), b), c), d), and e).

11. The method according to claim 1, wherein films are obtained by thermally crosslinking oligourethanes consisting essentially of components a), b), c), $d^I$), and e).

12. The method according to claim 2, wherein component c) is substituted with component e).

13. The method according to claim 3, wherein component c) is substituted with component e).

14. The method according to claim 4, wherein component c) is substituted with component e).

15. The method according to claim 1, wherein the amounts of the components a)-c) are the following:
component a): 10-70% by weight based on the total dry oligourethane, component b): the moles of b) are in a ratio with the moles of the NCO groups of a) ranging from 1/3:1 to 2/3:1;
component c): the moles of the hydroxyl groups of component c) are in a ratio with the moles of the residual free NCO groups (the difference between the total ones and those reacted with b)) in the range 3-1.1; the component c) can also be absent and in this case component e) is present; when c) is absent, the amount by moles of the components e)+d)+$d^I$) is in a ratio 1:1 with the moles of residual NCO (the difference between the initial total moles of a) and the moles of a) reacted with b)), and component e) must be present in an amount of at least 30% by weight based on the dry product;
when component c) is present the total moles of the components d)+$d^I$)+e) are in a percentage in the range 0-90% with respect to the moles of the component b).

16. The method according to claim 1, wherein the monomers mentioned in b) have the function $X_AH$ with $X_A=O$ and the following structure formula:

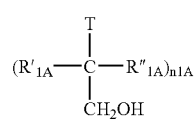

(1A)

wherein T is $SO_3H$, COOH, or a tertiary aminic group $NR'_NR''_N$, wherein $R'_N$ and $R''_N$ equal to or different from each other, are a linear or branched $C_1$-$C_6$ alkyl, $R'_{1A}$ and $R''_{1A}$, equal to or different from each other, are hydrogen or a linear or branched $C_1$-$C_4$ alkyl; n1A is an integer in the range 1-10.

17. The method according to claim 16, in formula (1A) T is a tertiary aminic group.

18. The method according to claim 1, wherein the bifunctional (per)fluoropolyethers mentioned in c) have one or more of the following units statistically distributed along the chain: ($C_3F_6O$), (CFYO) wherein Y is F, $CF_3$, ($C_2F_4O$), or ($CR_4R_5CF_2CF_2O$) wherein $R_4$ and $R_5$ are equal to or different from each other selected from H, Cl, and one fluorine atom of the perfluoromethylene unit can be substituted with H, Cl or (per)fluoroalkyl, having from 1 to 4 carbon atoms.

19. The method according to claim 18, wherein the (per)fluoropolyethers are the following, with the perfluorooxyalkylene units statistically distributed along the chain:

wherein m' and n' are integers such as to give the above mentioned molecular weights, and
(i) m'/n' is in the range 5-40; or
(ii) n' can also be 0; and
Y is F or $CF_3$;

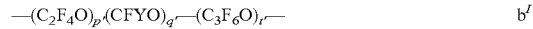

wherein p' and q' are integers such that p'/q' ranges from 5 to 0.3 and such that the molecular weight is within the above mentioned limits; and wherein:
(i) t' is an integer with the meaning of m';
(ii) t' can be 0 and q'/(q'+p'+t') is equal to 1/10 or lower; or
(iii) the t'/p' ratio ranges from 0.2 to 6; and
Y is F or $CF_3$;

wherein $R_4$ and $R_5$ are equal to or different from each other and selected from H, Cl; the molecular weight such as to be within the above mentioned limits, and one fluorine atom of the perfluoromethylene unit can be substituted with H, Cl or (per)fluoroalkyl;
the end groups of the bifunctional (per)fluoropoly-ethers c), equal to or different from each other, have formula $HO(CH_2CH_2O)_{x0}CH_2$—, wherein x0 is an integer from 0 to 4.

20. The method according to claim 1, wherein the monomers d) have formula (1A)

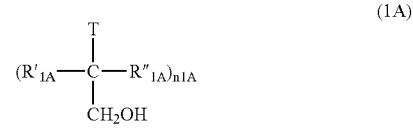

wherein:
T is $Y_0$, wherein $Y_0$ is selected from the following functional groups:

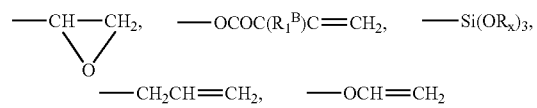

wherein
$R_I^B$=H, $CH_3$;
$R_x$ is a saturated $C_1$-$C_5$ alkyl;
$R'_{1A}$ and $R''_{1A}$, equal to or different from each other, are hydrogen or a linear or branched $C_1$-$C_4$ alkyl;
n1A is an integer in the range 1-10; and
the OH group can optionally be substituted with an —SH group.

21. The method according to claim 18, wherein the component e) is formed of hydroxyl mono-functional (per)

fluoropolyethers, said (per)fluoropolyethers having one or more (per)fluorooxyalkylene units as indicated in claim 18.

22. The method according to claim 21, wherein the (per)fluoropolyethers are the following, wherein the units are statistically distributed along the chain:

$$A'O(C_3F_6O)_m(CFYO)_n— \qquad IB$$

wherein Y is —F, —CF$_3$; A'=—CF$_3$, —C$_2$F$_5$, —C$_3$F$_7$, —CF$_2$Cl, C$_2$F$_4$Cl; the C$_3$F$_6$O and CFYO units are randomly distributed along the (per)fluoropolyether chain, m and n are integers, the m/n ratio is >2;

$$C_3F_7O(C_3F_6O)_m— \qquad IIB$$

wherein m is an integer, wherein the number average molecular weight is that above mentioned;

$$(C_3F_6O)_m(C_2F_4O)_n(CFYO)_q \qquad IIIB$$

wherein Y is equal to —F, —CF$_3$; m, n and q, different from zero, are integers such that the number average molecular weight is that indicated for the component e);

the end group being HO(CH$_2$CH$_2$O)$_{x0}$CH$_2$— wherein x0 is an integer in the range 0-4.

23. The method according to claim 1, wherein the component e) is formed of hydroxyl monofunctional (per)fluoroalkanes having the formula:

$$(R_{fI})_{pI}Q—OH \qquad (e')$$

wherein R$_{fI}$ is a fluoroalkyl C$_3$-C$_{30}$ radical; pI is 1 or 2; Q is bivalent aliphatic C$_1$-C$_{12}$ or aromatic C$_6$-C$_{12}$ linking bridge; Q is optionally substituted with a substituent selected from heteroatoms, N, O, S, or carbonylimino, sulphonylimino and carbonyl groups; Q can be unsubstituted or it is bound to substituents selected from the following: halogen atoms, hydroxyl groups, C$_1$-C$_6$ alkyl radicals.

24. The method according to claim 1, wherein the number average molecular weight is in the range 2,000-9,000.

25. The method according to claim 1, wherein when in the formula (Ib) X$_0$=OH, b=1, R$_1^A$=R$_2^A$=H, Y$_0$ is a hydrophilic group having formula $$—CH_2O—(CH_2—CH_2O)_{nI}—CH_3 \qquad (Ib1)$$

wherein nI is an integer in the range 3-20.

* * * * *